US 7,149,759 B2
Dec. 12, 2006

(12) United States Patent
Morrison

(10) Patent No.: US 7,149,759 B2
(45) Date of Patent: Dec. 12, 2006

(54) METHOD AND SYSTEM FOR DETECTING CONFLICTS IN REPLICATED DATA IN A DATABASE NETWORK

(75) Inventor: Michael Morrison, Ben Lomond, CA (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 10/107,095

(22) Filed: Mar. 25, 2002

(65) Prior Publication Data

US 2003/0182319 A1    Sep. 25, 2003

(51) Int. Cl.
*G06F 17/30* (2006.01)
(52) U.S. Cl. ............... 707/201; 707/200; 707/203; 707/10
(58) Field of Classification Search ............... 707/10
See application file for complete search history.

(56) References Cited

U.S. PATENT DOCUMENTS

| | | | |
|---|---|---|---|
| 4,432,057 A | 2/1984 | Daniell et al. | |
| 4,631,673 A | 12/1986 | Haas et al. | |
| 5,261,094 A | 11/1993 | Everson et al. | |
| 5,333,265 A | 7/1994 | Orimo et al. | |
| 5,737,601 A | 4/1998 | Jain et al. | |
| 5,790,117 A | 8/1998 | Halviatti et al. | |
| 5,806,074 A | 9/1998 | Souder et al. | |
| 5,806,075 A | 9/1998 | Jain et al. | |
| 6,002,871 A | 12/1999 | Duggan et al. | |
| 6,058,401 A * | 5/2000 | Stamos et al. | 707/201 |
| 6,088,706 A | 7/2000 | Hild | |
| 6,122,630 A | 9/2000 | Strickler et al. | |
| 6,167,534 A | 12/2000 | Straathof et al. | |
| 6,233,623 B1 | 5/2001 | Jeffords et al. | |
| 6,484,109 B1 * | 11/2002 | Lofall | 702/56 |
| 2002/0124006 A1 * | 9/2002 | Parnell et al. | 707/102 |

FOREIGN PATENT DOCUMENTS

EP    0716385    6/1996

(Continued)

OTHER PUBLICATIONS

Brietbart, Yuri et al., "Replication and Consistency: Being Lazy Helps Sometimes," PODS, 1997, pp. 173-184. (Note: To Correct Typographical Error. Applicant Previously Enclosed Copy on Mar. 25, 2002).

(Continued)

*Primary Examiner*—Jean M. Corrielus
(74) *Attorney, Agent, or Firm*—Sawyer Law Group LLP

(57) ABSTRACT

A method and system for detecting conflicts in replicated data in a database network that includes a plurality of computer systems, each having a table which includes replicated data includes providing a column to the table in each system which indicates whether replicated data in the table is current for the system. The method further includes determining whether replicated data in the table in the system is current based on a value in the column when a request to access the replicated data in the table is received.

Through aspects of the method and system of the present invention, conflict detection is delayed until a request to access the replicated data in the system is submitted. Thus, no conflict detection is required during the replication cycle, nor is any conflict resolution required during the replication cycle. In an environment with many thousands or millions of rows being replicated, but with few actual conflicts, delaying the detection and resolution until the system actually accesses the replicated data greatly improves the overall performance of the replication environment.

26 Claims, 6 Drawing Sheets

FOREIGN PATENT DOCUMENTS

| | | |
|---|---|---|
| JP | 09244933 | 9/1997 |
| JP | 2000047919 | 2/2000 |
| WO | 9735270 | 9/1997 |

OTHER PUBLICATIONS

Bernstein, Philip A. et al., "Concurrency Control in Distributed Database Systems," Computing Surveys, vol. 13, No. 2, Jun. 1981, pp. 185-221.

Breithart, Yuri et al., "Replication and Consistency: Being Lazy Helps Sometimes," PODS, 1997, pp. 173-184.

Carey, Michael J. et al., Conflict Detection Tradeoffs for Replicated Data, ACM Transactions on Database Systems, vol. 16, No. 4, Dec. 1991, pp. 703-746.

Cowan, Crispin, "Optimistic Replication in HOPE," Computer Science Department, Middlesex College, University of Western Ohio, London, Ontario, pp. 1-22.

Gray, Jim et al, "The Dangers of Replicaiton and a Solution," SIGMOD, Jun. 1996, pp. 173-182.

Helal, Abdelsalam A. et al., "Replication Techniques in Distributed Systems," Kluwer Academic Publishers, 1996, pp. 53-58.

Howard, John et al., "Reconciliations," PODC, Aug. 1994, pp. 14-21.

* cited by examiner

| | column A 101a | column B 101b | column C 101c | Indicator Col. 110 |
|---|---|---|---|---|
| row A 102a | X | Y | Z | Value A 120a |
| row B 102b | Z | X | Y | Value B 120b |
| row C 102c | Y | Z | X | Value C 120c |

100

METHOD AND SYSTEM FOR DETECTING CONFLICTS IN REPLICATED DATA IN A DATABASE NETWORK

FIELD OF THE INVENTION

The present invention relates generally to database systems and, more particularly, to a method and system for detecting conflicts in replicated data in a peer-to-peer database network.

BACKGROUND OF THE INVENTION

In the current business environment, companies often have a need to maintain multiple copies of their corporate data in different databases in a distributed network. For instance, a company might want to keep a backup copy of its data for a disaster-recovery scenario, or the company might need to build a data warehouse from online databases, or it might want different physical locations to be able to access the same data without incurring the costs of long-distance network connections.

FIG. 1A is a simple block diagram illustrating one model, a master/replica network system 10, of such a business environment. As is shown, a master database 20 is maintained at a central location 30, such as the company's corporate headquarters, and copies or replicas of the database 25a–25c are accessible at one or more remote sites 40a–40c. Typically, the remote sites 40a–40c communicate with the central location 30 via any variety of communication links, such as LAN, WAN, or the Internet.

One way to maintain copies of the database is to download the master database 20 onto a tape or disk, send the tape or disk to the remote sites 40a–40c, and upload the data at the remote sites 40a–40c. For some applications, this method works well. For other applications, however, where frequent updates of the data is required, this method is impractical. In those cases, most conventional database management systems (DBMS) offer automated copying. Automated copying of a database is generally called replicating the data, and the task of copying the data is referred to as replication.

The replicas of the database 25a–25c can be "read only," that is, a user accessing the replica from a remote site, e.g., 40a, cannot manipulate the data locally. Updates to the database are performed on the master 20 only. A capture program 45 in the central location 30 reads the updates to a log 47 associated with the master copy 20 and writes them to a staging table 49. In an asynchronous replication system, an apply program 50 will extract the updates from the staging table 49 periodically, and propagate the updates to the remote sites 40a–40c, thereby updating the replicas 25a–25c therein.

The user can also be allowed to update the replica locally at a remote site, e.g., 40a. Here, a capture program 45a in the remote site 40a writes the update to a staging table 49a associated with the replica 25a. When the apply program 50 runs, it extracts, from each of the staging tables 49, 49a–49c, the updates to the database, and propagates the updates to the remote sites 40a–40c. If updates to the replicas 25a–25c as well as the master 20 are performed, the apply program 50 must be able to detect and resolve potential conflicts in the replicated data. For example, a conflict in the replicated data will arise if two applications, one at a remote site, e.g., 40a and one at the central location 30, attempt to update a value for a certain part number at essentially the same time. In this situation, the apply program 50 will detect a conflict and record an error message (not shown) for the user's review, and resolve the conflict by propagating the value recorded in the master database 20.

In a peer-to-peer network system 10', illustrated in FIG. 1B, one copy of the database is not designated as the master, but rather, all database copies 25a'–25c' in the network are treated as equals. In such an environment, remote sites 40a–40c are replaced with local systems or members 40a'–40c' where the user can access and manipulate data in the respective database locally. Like the master/replica network system 10, each of the members 40a'–40c' includes a capture program 45a'–45c' that reads updates to the local database 25a'–25c' from a log 47a'–47c' associated with each database 25a'–25c' and writes and writes to staging tables 49a'–49c'. An apply program 50' extracts the updates from the staging tables 49a'–49c' during an asynchronous replication cycle and propagates the updates throughout the members 40a'–40c' of the network. While the apply program 50' is shown as a separate stand alone module, those skilled in the art will appreciate that the apply program 50' can exist in one or all of the local systems 40a'–40c', depending on the design implementation of the replication network.

The peer-to-peer network system 10' provides several advantages over the master/replica network system illustrated in FIG. 1A. First, because it is not hierarchical, data flow between peers or members 40a'–40c' is simplified. In addition, the non-hierarchical system is readily scalable, i.e., a new member can be added easily simply by connecting it to the network. Moreover, because all members are equal, the failure of one member will not catastrophically affect the other members of the network. In such a situation, the other members will continue to communicate normally with one another, while the failed member recovers.

While providing such desirable features, the peer-to-peer network system also presents some difficulties. One such difficulty is in detecting and resolving conflicts in replicated data. First, detecting conflicts becomes difficult as the number of peers increases. For instance, if one member wishes to update a record in a replicated table, the member has no way of determining whether the existing record is the most current value because another member may have updated that value earlier. Moreover, resolving such conflicts is difficult because no one copy of the database is designated the de facto copy.

Presently, if conflict detection in a peer-to-peer network system 10' is conducted, it is performed during the replication cycle, that is, as the data is being copied from one member to another. In an environment with many thousands or millions of rows being replicated, but with few actual conflicts, such conflict detection is very costly because each row must be checked. Moreover, conflict resolution is generally performed manually by an administrator who examines an error flag when a conflict is detected, or in the alternative, by a rules-based application. Both methods are costly and cumbersome.

Accordingly, a need exists for a method and system that can detect and resolve conflicts in replicated data in a peer-to-peer database replication system. The method and system should detect and resolve conflicts in a cost effective manner, while improving the performance of the replication system. The present invention addresses such a need.

SUMMARY OF THE INVENTION

The present invention is directed to a method and system for detecting conflicts in replicated data in a database network. The database network includes a plurality of computer systems, each having a table which includes replicated data. According to the method and system of the present invention, a column is provided to the table in each system which indicates whether replicated data in the table is current for the system. The method and system further includes determining whether replicated data in the table in the system is current based on a value in the column when a request to access the replicated data in the table is received.

Through the aspects of the present invention, conflict detection is performed when a client wishes to access data in a row, as opposed to during a replication cycle. By delaying the conflict detection process until the data is actually needed, the overall performance of the replication process is significantly improved.

DETAILED DESCRIPTION

The present invention relates generally to database systems and, more particularly, to a method and system for detecting conflicts in replicated data in a peer-to-peer database network. The following description is presented to enable one of ordinary skill in the art to make and use the invention and is provided in the context of a patent application and its requirements. Various modifications to the preferred embodiment and the generic principles and features described herein will be readily apparent to those skilled in the art. For instance, while the following description focuses primarily on a peer-to-peer relational database network, the principles of the present invention can be utilized in other environments involving data replication in a distributed database network. Thus, the present invention is not intended to be limited to the embodiment shown but is to be accorded the widest scope consistent with the principles and features described herein.

Currently, conflict detection is conducted during the replication cycle, that is, as the data is being copied from one database to another database. In accordance with the present invention, however, conflict detection is delayed until an application program in a member actually accesses, e.g., updates or reads, the data. Thus, no conflict detection is required during the replication cycle, nor is any conflict resolution required during the replication cycle. If there are relatively few conflicts, delaying the detection and resolution until the application program actually needs the data can greatly improve the overall performance of the replication environment.

Figures 2, 3:
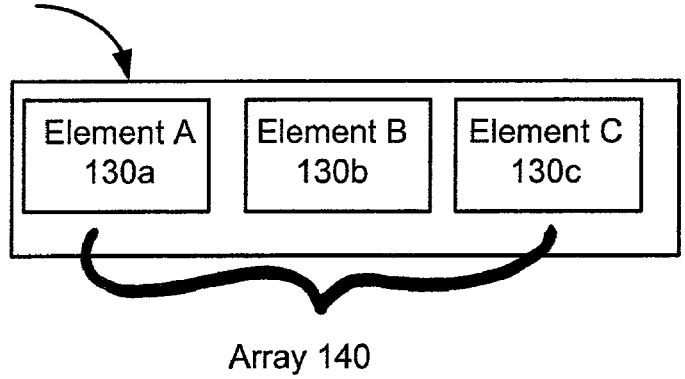
FIG. 2 illustrates a replicated table in accordance with the preferred embodiment of the present invention.
FIG. 3 illustrates a block representation of a value in the indicator column for a row, and the array type structure of the preferred embodiment.

In accordance with a preferred embodiment of the present invention, conflict detection is simplified by adding an extra column to each table in a database that is being replicated. FIG. 2 illustrates a replicated table in accordance with the preferred embodiment of the present invention. The extra column is referred to as a "conflict-detection indicator column," or simply as an "indicator column" 110. The indicator column 110 indicates whether any of the values in the other columns (101a–101c) in the table 100 have been updated. Each row (102a–102c) in the table 100 has a value (120a–120c) in the indicator column 110.

The data type for the indicator column 110 is such that the value (120a–120c) has structure. Thus, for example, a binary large object (BLOB) data type, which can support a wide range of structure types, would be suitable. In a preferred embodiment, the data structure is an array-type structure, that is, a well-ordered set of related values separated by a common binary value. The array can be of variable length or fixed length. Those skilled in the art would readily appreciate that other data structures would be suitable and that the principles described in the method and system of the present invention are not limited to the array-type structure described herein.

FIG. 3 illustrates a block representation of a value 120a' in the indicator column 110 for a row, e.g., 102a, and the array type structure of the preferred embodiment. As is shown, the value (120a') includes a plurality of elements (130a–130c) in the array 140. Each element (130a–130c) corresponds to a column (101a–101c) in the table, not including the indicator column 110 itself. Thus, for example, because the table 100 in FIG. 2 includes three (3) columns (101a–101c) of data and the indicator column 110, each value (120a–120c) in the indicator column 110 will have an array 140 of three (3) elements (130a–130c).

Figure 1A:
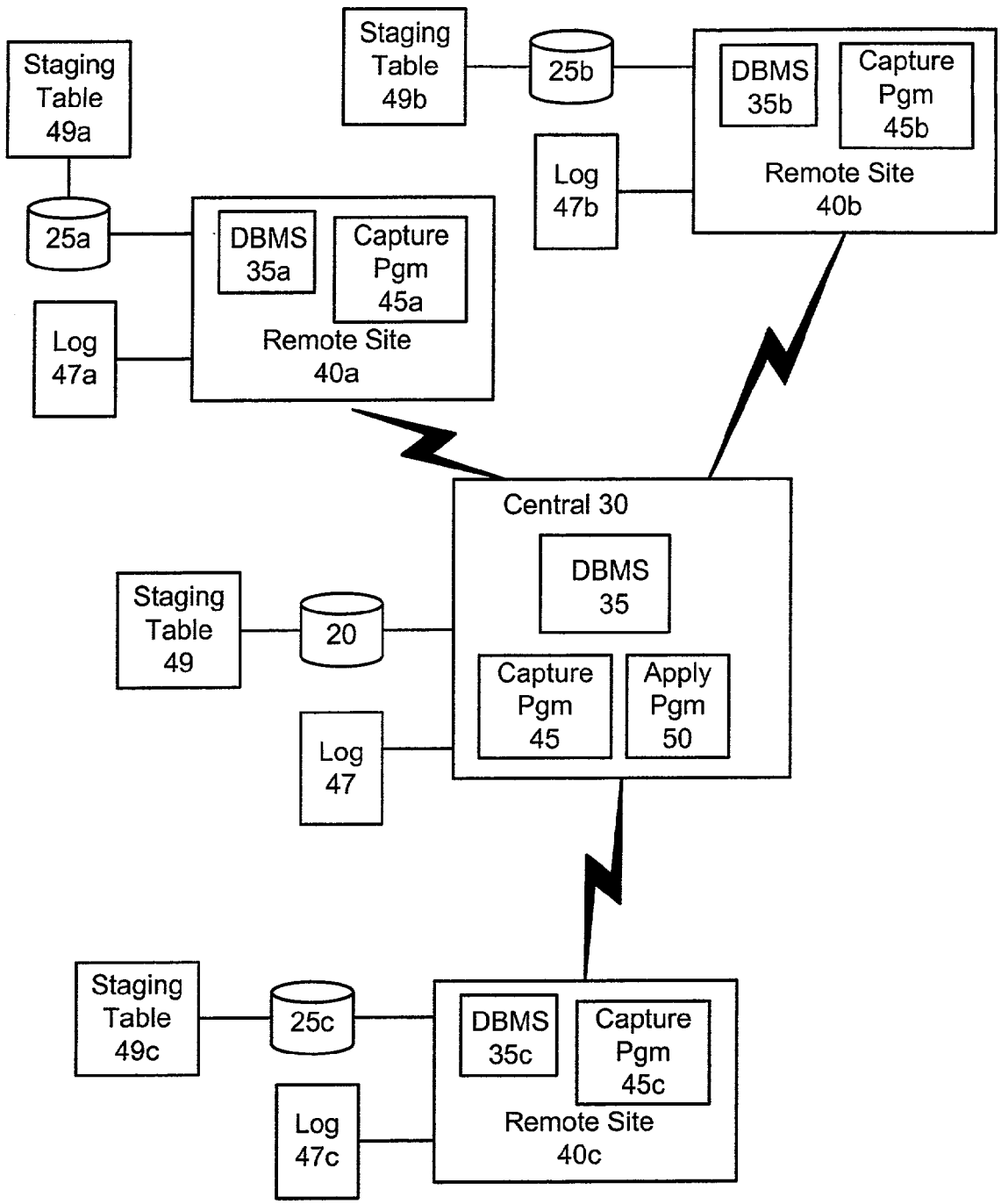
FIG. 1A is a simple block diagram of a master/replica network.
Figure 1B:
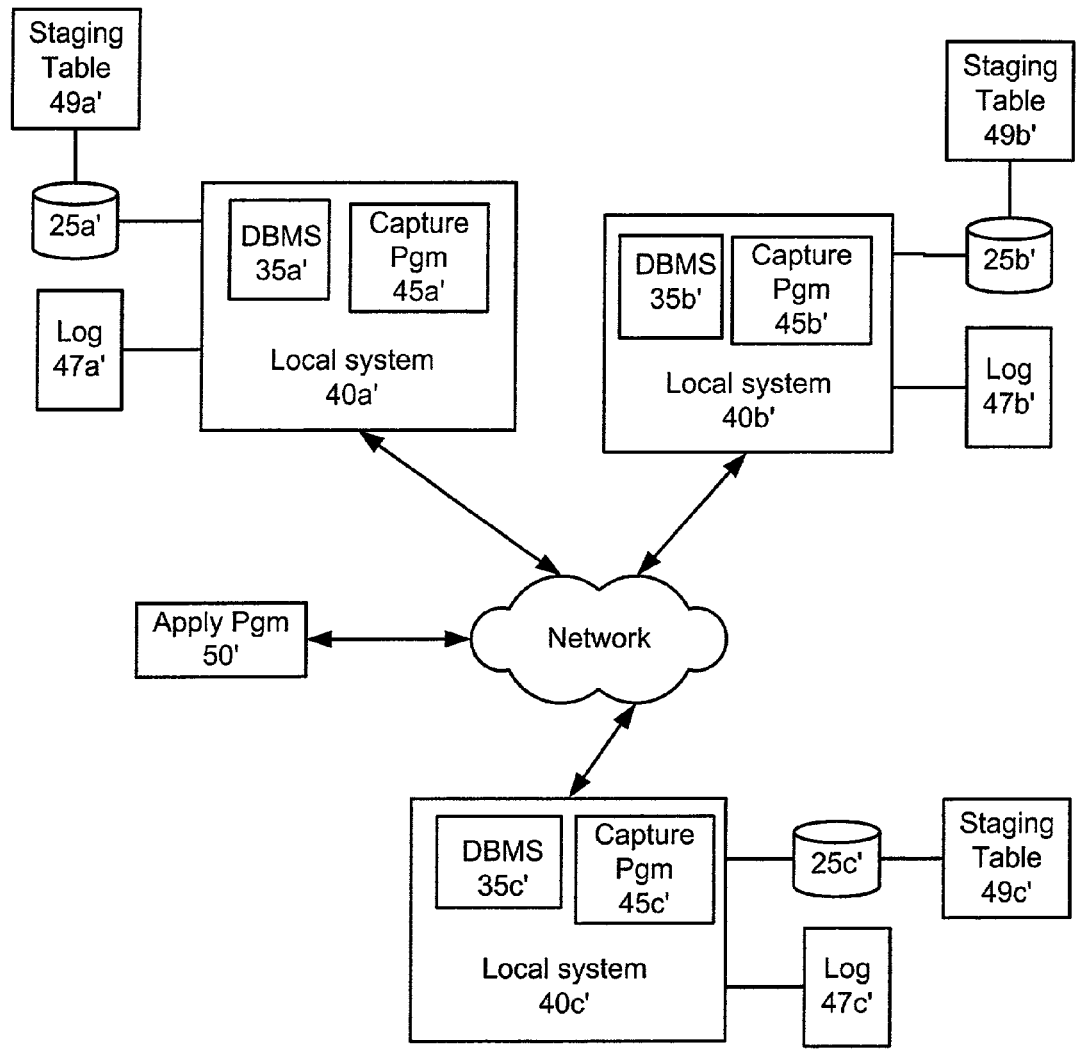
FIG. 1B is a simple block diagram of a peer-to-peer network that may be utilized in accordance with a preferred embodiment of the present invention.

Referring again to FIG. 3, each element (130a–130c) of the array 140 has a value that indicates whether the data stored in the corresponding column (101a–101c) has been updated. In a preferred embodiment, an element, e.g., 130a, has one of the following values: a NULL value, a LOCAL value, or an identifier. If the value of a particular array element, e.g., 130a, is NULL, then the record in the corresponding column 101a in the row 102a has not been updated, or was updated most recently by the local member, e.g., 40a' (FIG. 1B). In other words, the NULL value means the local member, e.g., 40a,' has the most current value for the corresponding column, 101a, and no conflict resolution will be required.

If the value of a particular array element, e.g. 130b, is LOCAL, then the local member 40a' has just updated the record in the corresponding column, e.g., 101b, in the table 100, but that data has not yet been replicated to the other members (40b', 40c') of the peer-to-peer network. Again, in this situation, a conflict is not detected and conflict resolution is not required.

Finally, if the value of a particular array element, e.g., 130c, is an identifier, then the record in the corresponding column, e.g., 101c, has been updated by the member identified by the identifier, and the local member 40a' does not have the most current value for the data in the corresponding column 101c. In this situation, a conflict is detected and conflict resolution is required. In a preferred embodiment, the identifier value is the system name or address of the non-local member. Nevertheless, one skilled in the art would appreciate that the identifier can be any unique value that identifies the source of an update, such as a database name.

Accordingly, based on the values of the array elements (130a–130c) in the indicator column 110, an application program running on a local system, e.g., 40a', can detect a potential data conflict and access the most current data for a particular column in a row in a table. The system and method of the present invention quickly determines whether the local system 40a' possesses the most current data for a particular column in that row by checking the corresponding element value in the indicator column 110. If the local system 40a' does not possess the most current data, e.g. because the data in the column for that row has been updated by another member (40b', 40c') of the peer-to-peer network, the system and method of the present invention indicates, via the indicator column 110, which member (40b', 40c') possesses the most current data.

Figure 4:
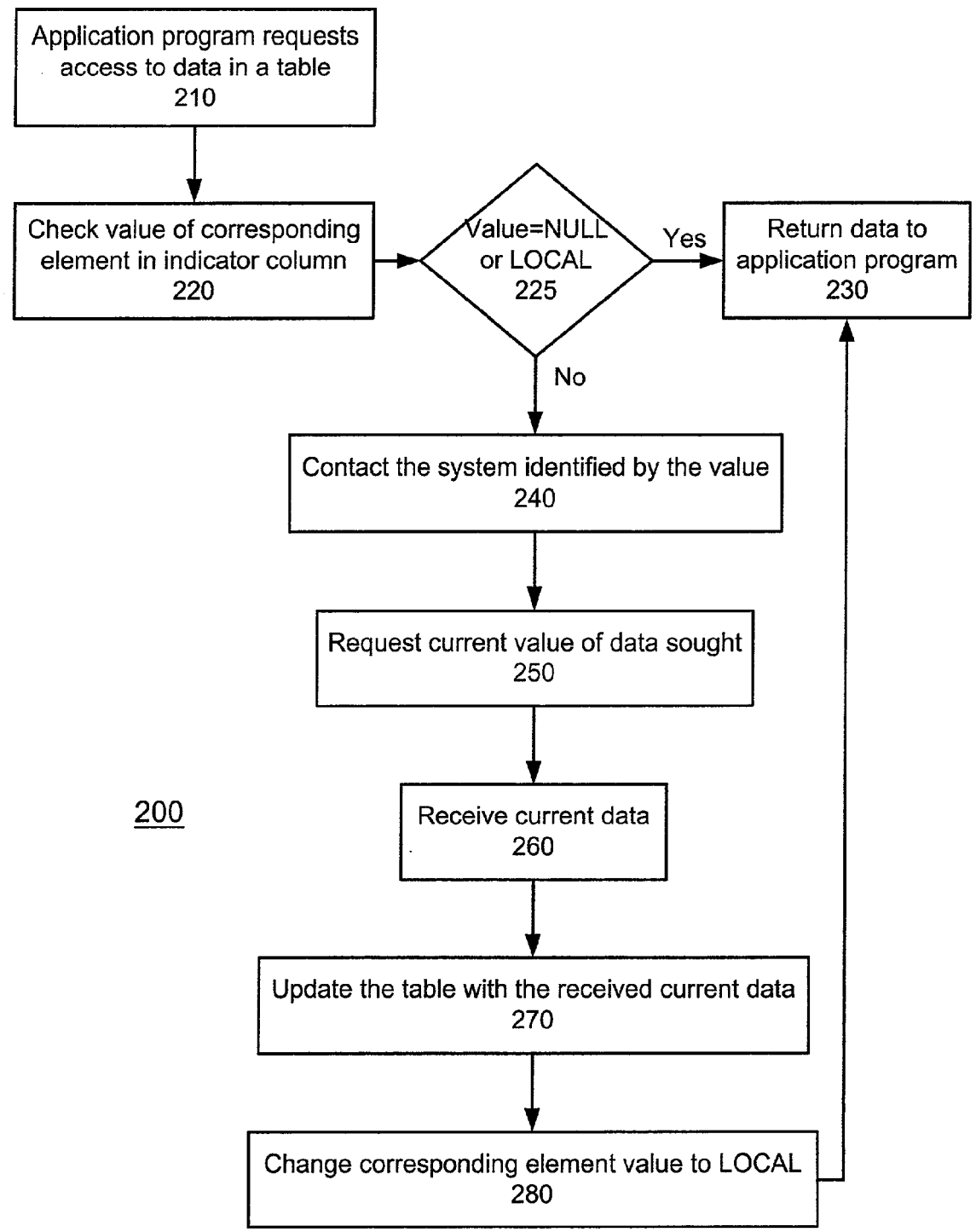
FIG. 4 is a flowchart illustrating a process for conflict detection and resolution in accordance with a preferred embodiment of the present invention.

FIG. 4 is a flowchart illustrating a process for conflict detection and resolution in accordance with a preferred embodiment of the present invention. The process begins in step 210 when an application program in a particular local member, e.g., 40a', processes a request from a user to access a record stored in the local database 25a.' The user's request can be one to update or to read data from the database 25a.' In either case, it is desirable to access the most current data available.

In step 220, the system and method of the present invention checks the column(s) affected by the application program's request and its corresponding element value from the indicator column 110. The element value is then compared with NULL and LOCAL in step 225. If the comparison shows NULL or LOCAL for the value, the data in the column is the must current data available, and returned to the application program for normal processing, via step 230. No conflict has been detected and therefore conflict resolution is not required.

If, however, the comparison shows some other value than NULL or LOCAL, a conflicted is detected, and conflict resolution is required. Steps 240–280 describe conflict resolution in accordance with a preferred embodiment of the present invention. As stated above, if the local database 25a' in the local system 40a' does not possess the most current value for data in the column in a row, the corresponding element value is an identifier that indicates the member, e.g., 40b', that does possess the most current value. For the sake of clarity, a member or system identified by the value of the corresponding element will be referred to generally as a "remote system." Thus, in step 240, the system and method of the present invention contacts the remote system 40b' identified by the array value, and in step 250, requests the current value of the column for the row in the table 25b' stored in that remote system 40b'.

Figure 5:
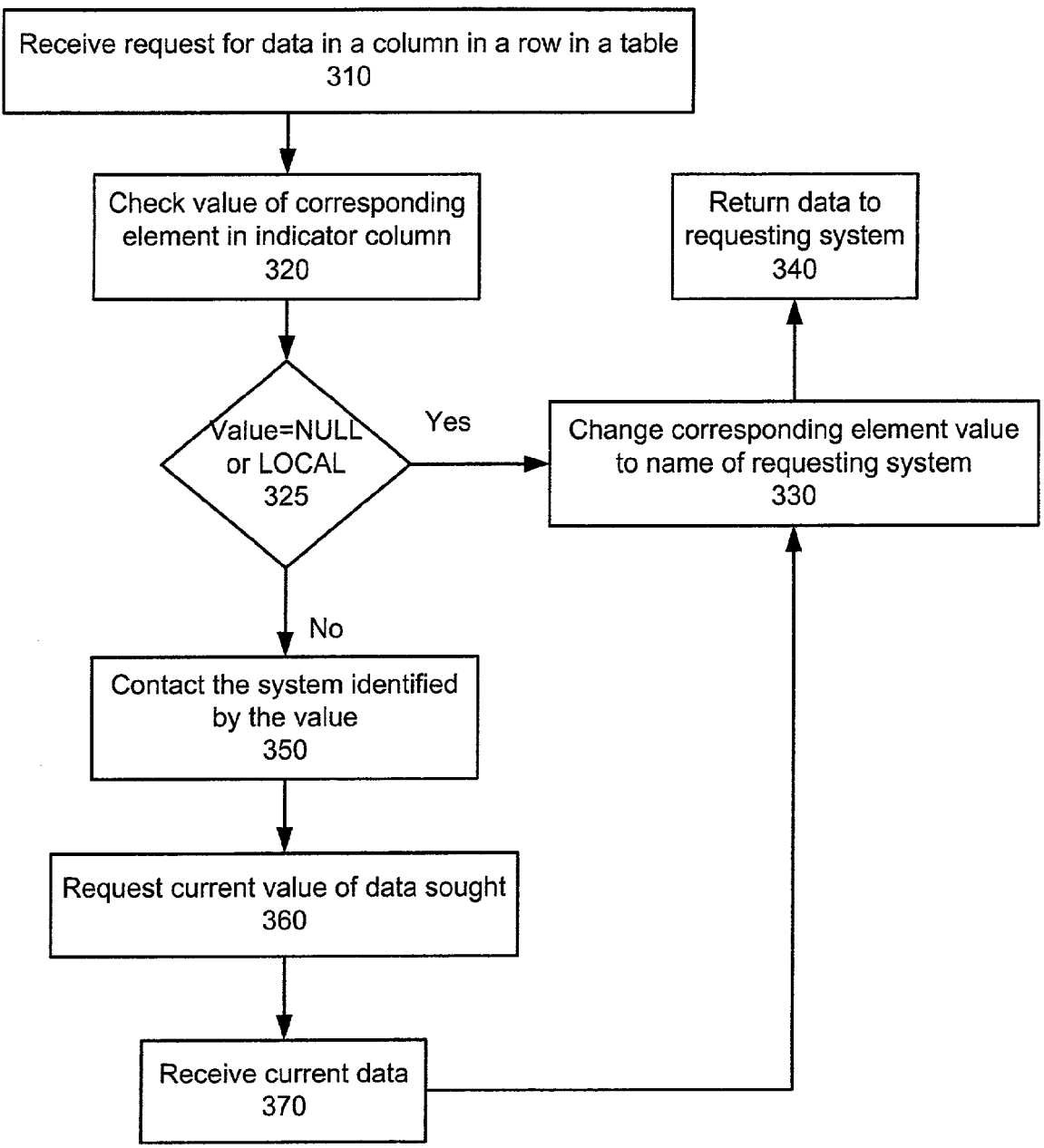
FIG. 5 is a flow chart illustrating a process by which the remote system handles the request for data from the local or requesting system in accordance with a preferred embodiment of the present invention.

Referring now to FIG. 5, illustrated is a process 300 by which the remote system 40b' handles the request for data from the local or requesting system, e.g., 40a,' in accordance with a preferred embodiment of the present invention. In step 310, the remote system 40b' receives the request for the current data value stored in a column and a row of a table. In step 320, the remote system 40b' checks the element value corresponding to the column and row from the indicator column 110.

If the corresponding element value is NULL or LOCAL for the requested column and row, the remote system 40b' updates the corresponding element value from NULL or LOCAL to the name of the requesting system 40a' in the indicator column 110, via step 330. By changing the element value in this manner, subsequent requests for the data that occur before the next replication cycle completes are properly forwarded to the requesting system. In step 340, the remote system 40b' returns the data value stored in the column and row back to the requesting system 40a.'

If the corresponding element value is not NULL or LOCAL, i.e., the value identifies another remote system (e.g., 40c'), the remote system 40b' contacts the identified system 40c' (step 350) and requests the data value from that system, in step 360, which at this point, perceives the remote system 40b' as a requesting system. Process steps 310–360 repeat until the most current data is returned. Once the remote system 40b' receives the most current data value (step 370), it updates the corresponding element value to the name of the requesting system 40a,' via step 330, and transmits the received data value to the requesting system 40a.' In this way, the most current data value is found somewhere in the network and sent back to the preceding requesting system until the original requesting system 40a' receives the data.

In another preferred embodiment, when the remote system, e.g., 40b,' determines that another system, e.g., 40c,' has the most current data value, the remote system 40b' includes with its request for the data the name of the original requesting system 40a.' In this way, the final system that has the most current data value could send it directly to the original requesting system 40a,' bypassing the intermediate systems. This bypass would improve response time for the original requesting system 40a.'

Referring again to FIG. 4, once the local system 40a' receives the most current data in step 260, the system and method of the present invention updates the table with that value (step 270), and, in step 280, changes the corresponding element value in the indicator column 110 to LOCAL, indicating that the local system 40a' now has the most current value for that column. That data value is then returned to the application program for normal processing, via step 230.

Figure 6:
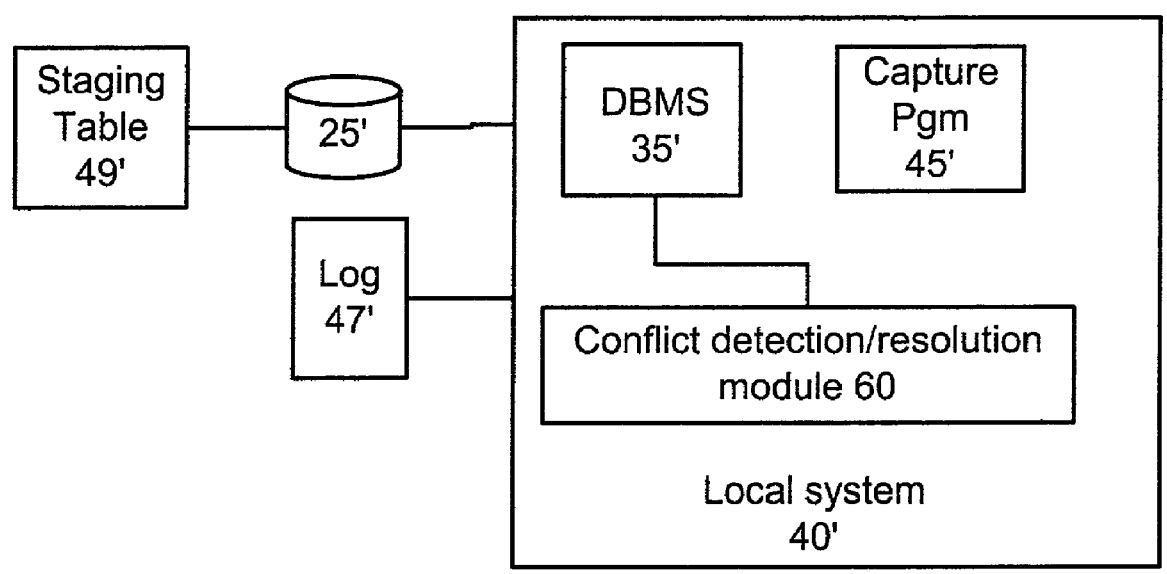
FIG. 6 is a block diagram of a member of a peer-to-peer network in accordance with one preferred embodiment of the present invention.

In one preferred embodiment of the present invention, the conflict detection and resolution process described in FIGS. 4 and 5 is implemented via a stand alone application module 60 coupled to the DBMS 35' (shown schematically in FIG. 6). Thus, if the application module 60 fails, it will not adversely affect the operation of the DBMS 35.'

In another preferred embodiment, the application module is integrated into the DBMS 35' and is implemented using a trigger or stored procedure, i.e., program code stored in the database. The stored procedure runs whenever a local application program requests access to data, e.g. to update or read, stored in a table that is replicated. The stored procedure would also run whenever a request for data in the table is received from another system in the network. The stored procedure would not run when the table is updated during a replication cycle.

In another preferred embodiment, the database system itself checks for conflicts and resolves them during the processing of an SQL UPDATE statement or during an SQL SELECT statement. In this embodiment, a trigger or stored procedure is not required, which can improve overall system performance. Naturally, those skilled in the art would appreciate that other methods of implementation are available, and the embodiments presented above are merely examples of three such methods.

In accordance with the system and method of the present invention, the element values in the indicator column 110 are updated, while the data values in the table are replicated during a replication cycle. So, for instance, if the element value is NULL (i.e., the value in the corresponding column has not been updated since the last replication cycle), it will remain NULL after the replication cycle. If the element value is LOCAL (i.e., the value was updated by the local system, but has not been replicated to the other members of the network), it will be updated to NULL during the next replication cycle. If the element value is an identifier and the associated column is updated by another member of the network, then the element value will be updated during the next replication cycle to identify the member that performed the last update before the cycle.

The following example illustrates how the element value is updated between and during replication cycles. The network comprises four systems or members, named A, B, C, and D. Each system includes a table having one column, a Quantity Column. Accordingly, the array in the indicator column contains only one element corresponding to the Quantity Column. Table 1 below illustrates the element value in the indictor column corresponding to the value in the Quantity Column for an exemplary part number (row) in each system. As is shown, initially, the value in the Quantity Column is 100.

TABLE 1

| System | Quantity Column | Indicator Column |
|---|---|---|
| A | 100 | NULL |
| B | 100 | NULL |
| C | 100 | NULL |
| D | 100 | NULL |

System B updates the quantity from 100 to 95, and a replication cycle is performed. Table 2 below shows how the values in both the Quantity Column and the Indicator Column are updated after the replication cycle is complete.

TABLE 2

| System | Quantity Column | Indicator Column |
|---|---|---|
| A | 95 | B |
| B | 95 | NULL |
| C | 95 | B |
| D | 95 | B |

Because system B was the last system to update the value in the Quantity Column, each of the other systems, e.g., A, C and D, reflect that system B has the most current value of the Quantity Column. If any of systems A, C, or D were to request access (update or read) to the value of the Quantity Column for the exemplary part number, the replication system of the present invention would detect a conflict and transmit a request to system B for the most current value stored therein.

Thus, if system A requests to update the Quantity Column to 90, system A will detect a conflict, i.e., recognize that it does not have the most current value because the element value is a system name, e.g., system B. System A will resolve the conflict by requesting the most current value from system B. When system B sends the data to system A, system B will record the name of the system to which it sent the data, e.g., system A. When System A receives the data, it updates the value in the Quantity Column and changes the element value from B to LOCAL. Table 3 shows the column values after conflict resolution has completed, but before the subsequent replication cycle.

TABLE 3

| System | Quantity Column | Indicator Column |
|---|---|---|
| A | 90 | LOCAL |
| B | 95 | A |
| C | 95 | B |
| D | 95 | B |

Table 4 shows the column values after next replication cycle.

TABLE 4

| System | Quantity Column | Indicator Column |
|---|---|---|
| A | 90 | NULL |
| B | 90 | A |
| C | 90 | A |
| D | 90 | A |

If another system, e.g., system C, had requested to update the Quantity Column before the subsequent replication cycle had completed, system C would have asked system B for the value, and system B would have asked system A for the value. Because system A has the most current value, it would return the value to system C.

Through aspects of the present invention, all rows in a table are replicated without conflict detection during the replication cycle. Conflict detection is delayed until an application program in a local system actually updates (or, depending on the needs of the application, reads) the data. Thus, no conflict detection is required during the replication cycle, nor is any conflict resolution required during the replication cycle. In an environment with many thousands or millions of rows being replicated, but with few actual conflicts, such conflict detection is very costly because each row must be checked. If there are relatively few actual conflicts, delaying the detection and resolution until the application program actually accesses the data greatly improves the overall performance of the replication environment. Also, transactions running at the local system are never rolled back because of a replication conflict.

To perform conflict detection and resolution, an extra column, the indicator column, is added to each replicated table. The value in the indicator column indicates whether the records in any of the other columns have been updated. When an application program in the local system needs the data (for update, or possibly for read), the system and method of the present invention checks whether the requested column for that row has been updated by another member of the network. If not, processing is as usual for the local system. If yes, then the system and method reads the value of the indicator column to determine which system in the replication network has the most current value, and requests the current value from that system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for detecting conflicts in replicated data in a database network, wherein the database network includes a plurality of systems, each system including a table which includes replicated data, the method comprising the steps of:
   (a) providing a column to the table in each of the plurality of systems which indicates whether the replicated data in the table is current, wherein a replication cycle is performed after the replicated data is first updated by one of the plurality of systems and before the replicated data is subsequently updated by another of the plurality of systems, and wherein the providing step (a) further includes the steps of:
      (a1) defining a structured array data type for a value in the column, wherein the structured array includes a plurality of elements and each element is associated with replicated data stored in a column in a given row in the table, and
      (a2) assigning a value to each element, wherein the value indicates whether the replicated data stored in the associated column and the given row is current, the value of each element being one of a null value, a local value, and an identifier; and
   (b) determining whether the replicated data in the table in one of the plurality of systems is current based on the column when a request to access the replicated data in the table is received, wherein the determining step (b) further includes the steps of:
      (b1) checking the value of the element associated with the requested replicated data,
      (b2) determining that the requested replicated data is current if the value of the element is one of a null value and a local value, and
      (b3) determining that the requested replicated data is not current if the value is an identifier, wherein the identifier identifies a second system in the database network that has the current value for the requested replicated data.

2. The method of claim 1 further including the step of:
   (c) obtaining a current value of the requested replicated data if the requested replicated data in the one system is not current.

3. The method of claim 2, wherein the obtaining step (c) further includes the steps of:
   (c1) contacting a second system identified by a value in the column;
   (c2) requesting from the second system the current value of the replicated data; and
   (c3) transmitting the current value of the replicated data from the second system to the one system.

4. The method of claim 3, wherein the obtaining step (c) further includes the step of:
   (c4) updating, in the table in the second system, the value in its column to an identifier identifying the one system.

5. The method of claim 3, wherein the obtaining step (c) further includes the steps of:
   (c4) checking, in the table in the second system, the value in its column to determine whether the requested replicated data in the second system is current;
   (c5) obtaining the current value of the requested replicated data from a third system identified by the value in the column if the requested replicated data in the second system is not current; and
   (c6) repeating steps (c4) and (c5) in successive systems until the current value of the requested replicated data is found.

6. The method of claim 2 further including the steps of:
   (d) updating the requested replicated data with the current value;
   (e) changing the value in the column to indicate that the replicated data is current; and
   (f) returning the current value of the requested replicated data for further processing.

7. A computer usable medium containing programming instructions for detecting conflicts in replicated in a database network, wherein the database network includes a plurality of systems, each system including a table which includes replicated data, the programming instructions for:
   (a) providing a column to the table in each of the plurality of systems which indicates whether the replicated data in the table is current, wherein a replication cycle is performed after the replicated data is first updated by one of the plurality of systems and before the replicated data is subsequently updated by another of the plurality of systems, and wherein the providing step (a) further includes the steps of:
      (a1) defining a structured array data type for a value in the column, wherein the structured array includes a plurality of elements and each element is associated with replicated data stored in a column in a given row in the table, and
      (a2) assigning a value to each element, wherein the value indicates whether the replicated data stored in the associated column and the given row is current, the value of each element being one of a null value, a local value, and an identifier; and
   (b) determining whether the replicated data in the table in one of the plurality of systems is current based on the column when a request to access the replicated data in the table is received, wherein the determining step (b) further includes the steps of:
      (b1) checking the value of the element associated with the requested replicated data,
      (b2) determining that the requested replicated data is current if the value of the element is one of a null value and a local value, and
      (b3) determining that the requested replicated data is not current if the value is an identifier, wherein the identifier identifies a second system in the database network that has the current value for the requested replicated data.

8. The computer usable medium of claim 7 further including the instruction for:
   (c) obtaining a current value of the requested replicated data if the requested replicated data in the one system is not current.

9. The computer usable medium of claim 8, wherein the obtaining instruction (c) further includes the instructions for:
   (c1) contacting a second system identified by a value in the column;
   (c2) requesting from the second system the current value of the replicated data; and
   (c3) transmitting the current value of the replicated data from the second system to the one system.

10. The computer usable medium of claim 9, wherein the obtaining instruction (c) further includes the instructions for:
    (c4) updating, in the table in the second system, the value in its column to an identifier identifying the one system.

11. The computer usable medium of claim 9, wherein the obtaining instruction (c) further includes the instructions for:
    (c4) checking, in the table in the second system, the value in its column to determine whether the requested replicated data in the second system is current;

(c5) obtaining the current value of the requested replicated data from a third system identified by the value in the column if the requested data in the second system is not current; and (c6) repeating steps (c4) and (c5) in successive systems until the current value of the requested replicated data is found.

12. The computer usable medium of claim 8 further including the instructions for:

(d) updating the requested replicated data with the current value;

(e) changing the value in the column to indicate that the replicated data is current; and (f) returning the current value of the requested replicated data for further processing.

13. A system for detecting conflicts in replicated data in a database network, wherein the database network includes a plurality of computer systems, each computer system including a database management system ("DBMS") and a table which includes replicated data, the system comprising:

a column appended to the table in each of the plurality of computer systems, wherein the column indicates whether replicated data in the table in the computer system is current, wherein a replication cycle is performed after the replicated data is first updated by one of the plurality of systems and before the replicated data is subsequently updated by another of the plurality of systems, and wherein a structured array data type is defined for a value in the column, the structured array including a plurality of elements, wherein each element is associated with replicated data stored in a column in a given row in the table; and a conflict detection/resolution module in each of the plurality of computer systems coupled to the DBMS, wherein the conflict detection/resolution module in the computer system includes:

means for assigning a value to each element, wherein the value indicates whether the replicated data stored in the associated column and the given row is current, the value of each element being one of a null value, a local value, and an identifier, and means for determining whether replicated data in the computer system is current based on the column when a request to access replicated data in the table is received, wherein the determining means further includes:

means for checking the value of the element associated with the requested replicated data, means for determining that the requested replicated data is current if the value of the element is one of a null value and a local value, and means for determining that the requested replicated data is not current if the value is an identifier, wherein the identifier identifies a second computer system in the database network that has the current value for the requested replicated data.

14. The system of claim 13, wherein the conflict detection/resolution module further includes means for obtaining a current value of the requested replicated data if the requested replicated data in the computer system is not current.

15. The system of claim 14, wherein the obtaining means includes:

means for contacting a second computer system identified by a value in the column;

means for requesting from the second computer system the current value of the replicated data; and means for receiving the current value of the replicated data from the second computer system.

16. The system of claim 14, wherein the conflict detection/resolution module further includes:

means for updating the requested replicated data with the current value;

means for changing the value in the column to indicate that the replicated data is current; and means for returning the current value of the requested replicated data for further processing.

17. The system of claim 13, wherein the conflict detection/resolution module further includes:

means for receiving a request for replicated data in the table from a requesting computer system in the database network; and means for transmitting the replicated data to the requesting computer system if the replicated data is current.

18. A method for resolving conflicts in replicated data in a peer-to-peer database network, wherein the database network includes a plurality of members, each member including a table which includes replicated data, the method comprising the steps of:

(a) adding a conflict detection indicator column to the table in each member, wherein the conflict detection indicator column indicates whether replicated data in the table is current, wherein a replication cycle is performed after the replicated data is first updated by one of the plurality of systems and before the replicated data is subsequently updated by another of the plurality of systems;

(b) examining a value in the conflict detection indicator column to determine whether replicated data in the table in a first member is current when a request to access replicated data in the table is received;

(c) obtaining current replicated data from a second member identified by the value in the conflict detection indicator column if the replicated data in the table in the first member is not current;

(d) updating the replicated data in the first member with the current replicated data; and (e) modifying the value in the conflict detection indicator column to indicate that the replicated data in the table in the first member is current.

19. The method of claim 18, wherein the adding step (a) further includes the steps of:

(a1) defining a structured array data type for the value in the conflict detection indicator column, wherein the structured array includes a plurality of elements and each element is associated with replicated data stored in an associated column in a given row in the table; and (a2) assigning a value to each element, wherein the value is one of a null value, a local value, and an identifier.

20. The method of claim 19, wherein the examining step (b) further includes the steps of:

(b1) checking the value of the element associated with the requested replicated data;

(b2) determining that the requested replicated data is current if the value of the element is one of a null value and a local value; and (b3) determining that the requested replicated data is not current if the value is an identifier, wherein the identifier identifies the second member in the database network that has the current value for the requested replicated data.

21. A computer usable medium containing programming instructions for resolving conflicts in replicated data in a peer-to-peer database network, wherein the database network includes a plurality of members, each member including a table which includes replicated data, the programming instructions for:
(a) adding a conflict detection indicator column to the table in each member, wherein the conflict detection indicator column indicates whether replicated data in the table is current, wherein a replication cycle is performed after the replicated data is first updated by one of the plurality of systems and before the replicated data is subsequently updated by another of the plurality of systems;
(b) examining a value in the conflict detection indicator column to determine whether replicated data in the table in a first member is current when a request to access replicated data in the table is received;
(c) obtaining current replicated data from a second member identified by the value in the conflict detection indicator column if the replicated data in the table in the first member is not current;
(d) updating the replicated data in the first member with the current replicated data; and
(e) modifying the value in the conflict detection indicator column to indicate that the replicated data in the table in the first member is current.

22. The computer usable medium of claim 21, wherein the adding instruction (a) further includes the instructions for:
(a1) defining a structured array data type for the value in the conflict detection indicator column, wherein the structured array includes a plurality of elements and each element is associated with replicated data stored in an associated column in a given row in the table; and
(a2) assigning a value to each element, wherein the value is one of a null value, a local value, and an identifier.

23. The computer usable medium of claim 22, wherein the examining instruction (b) further includes the instructions for:
(b1) checking the value of the element associated with the requested replicated data;
(b2) determining that the requested replicated data is current if the value of the element is one of a null value and a local value; and
(b3) determining that the requested replicated data is not current if the value is an identifier, wherein the identifier identifies the second member in the database network that has the current value for the requested replicated data.

24. A system for resolving conflicts in replicated data in a peer-to-peer database network, wherein the database network includes a plurality of members, each member including a table which includes replicated data, the system comprising:
means for adding a conflict detection indicator column to the table in each member, wherein the conflict detection indicator column indicates whether replicated data in the table is current, wherein a replication cycle is performed after the replicated data is first updated by one of the plurality of systems and before the replicated data is subsequently updated by another of the plurality of systems;
means for examining a value in the conflict detection indicator column to determine whether replicated data in the table in a first member is current when a request to access replicated data in the table is received;
means for obtaining current replicated data from a second member identified by the value in the conflict detection indicator column if the replicated data in the table in the first member is not current;
means for updating the replicated data in the first member with the current replicated data; and
means for modifying the value in the conflict detection indicator column to indicate that the replicated data in the table in the first member is current.

25. The system of claim 24, wherein the adding means further includes:
means for defining a structured array data type for the value in the conflict detection indicator column, wherein the structured array includes a plurality of elements and each element is associated with replicated data stored in an associated column in a given row in the table; and
means for assigning a value to each element, wherein the value is one of a null value, a local value, and an identifier.

26. The system of claim 25, wherein the examining means further includes:
means for checking the value of the clement associated with the requested replicated data;
means for determining that the requested replicated data is current if the value of the element is one of a null value and a local value; and
means for determining that the requested replicated data is not current if the value is an identifier, wherein the identifier identifies the second member in the database network that has the current value for the requested replicated data.

* * * * *